US010532521B2

(12) United States Patent
Lanfant et al.

(10) Patent No.: US 10,532,521 B2
(45) Date of Patent: Jan. 14, 2020

(54) METHOD OF FABRICATING A COMPOSITE MATERIAL PART HAVING A BODY INTEGRAL WITH ONE OR MORE PLATFORMS

(71) Applicant: SAFRAN, Paris (FR)

(72) Inventors: Nicolas Pierre Lanfant, Palaiseau (FR); Sébastien Pautard, Palaiseau (FR)

(73) Assignee: SAFRAN, Paris (FR)

( * ) Notice: Subject to any disclaimer, the term of this patent is extended or adjusted under 35 U.S.C. 154(b) by 69 days.

(21) Appl. No.: 15/773,897

(22) PCT Filed: Nov. 3, 2016

(86) PCT No.: PCT/FR2016/052848
§ 371 (c)(1),
(2) Date: May 4, 2018

(87) PCT Pub. No.: WO2017/077240
PCT Pub. Date: May 11, 2017

(65) Prior Publication Data
US 2018/0319101 A1    Nov. 8, 2018

(30) Foreign Application Priority Data

Nov. 6, 2015   (FR) ...................... 15 60649

(51) Int. Cl.
*B29C 70/22*   (2006.01)
*B29C 70/48*   (2006.01)
(Continued)

(52) U.S. Cl.
CPC ............ *B29C 70/222* (2013.01); *B29C 70/48* (2013.01); *B29D 99/0003* (2013.01);
(Continued)

(58) Field of Classification Search
CPC ............ B29D 99/0025; B29D 99/0028; B29D 99/0003; C04B 2235/48;
(Continued)

(56) References Cited

U.S. PATENT DOCUMENTS 5,246,756 A   9/1993   All et al.
5,965,266 A   10/1999  Goujard et al.

FOREIGN PATENT DOCUMENTS

EP            2 154 119 A1    2/2010
WO   WO 2013/079860 A1    6/2013

OTHER PUBLICATIONS

International Search Report as issued in International Patent Application No. PCT/FR2016/052848, dated Feb. 21, 2017.

*Primary Examiner* — Christopher J Besler
*Assistant Examiner* — Christine Pellazar Bersabal
(74) *Attorney, Agent, or Firm* — Pillsbury Winthrop Shaw Pittman LLP

(57)   ABSTRACT

A method of fabricating a composite material part having a body secured to at least one platform present at one end of the body, the method including using the fiber blank to form a preform for the part that is to be made by folding out segments of the second and third portions that are not interlinked with the first portion on opposite sides of the first portion, by shaping the folded-out segments of the second and third portions to form preform portions for a platform of the part to be fabricated, and by folding down the segment of the first portion in order to fill in the groove present in the gap between the second and third portions; and densifying the preform with a matrix in order to obtain a part made of composite material having at least one integrated platform.

7 Claims, 6 Drawing Sheets

(51) Int. Cl.
*B29D 99/00* (2010.01)
*F01D 5/28* (2006.01)
*C04B 35/563* (2006.01)
*C04B 35/571* (2006.01)
*C04B 35/628* (2006.01)
*C04B 35/83* (2006.01)
*B29L 31/00* (2006.01)
*B29L 31/08* (2006.01)

(52) U.S. Cl.
CPC ........ *B29D 99/0025* (2013.01); *C04B 35/563* (2013.01); *C04B 35/571* (2013.01); *C04B 35/62868* (2013.01); *C04B 35/62873* (2013.01); *C04B 35/83* (2013.01); *F01D 5/282* (2013.01); *B29L 2031/08* (2013.01); *B29L 2031/7504* (2013.01); *C04B 2235/48* (2013.01); *C04B 2235/5244* (2013.01); *C04B 2235/614* (2013.01); *C04B 2235/616* (2013.01)

(58) Field of Classification Search
CPC .... C04B 2235/5224; C04B 2235/5244; C04B 2235/614; C04B 2235/616; C04B 2235/5248; C04B 35/11; C04B 35/80; C04B 35/83; C04B 35/803; C04B 35/805; C04B 35/806; C04B 35/62873; C04B 35/62868; C04B 35/571; C04B 35/565; C04B 35/563; B29C 70/222; B29C 70/24; B29C 70/48; F01D 5/282; B29L 2031/08; B29L 2031/7504; Y10T 29/49337; F05D 2300/603; F05C 2253/04; Y02T 50/672; B29B 11/16; B23P 15/04
See application file for complete search history.

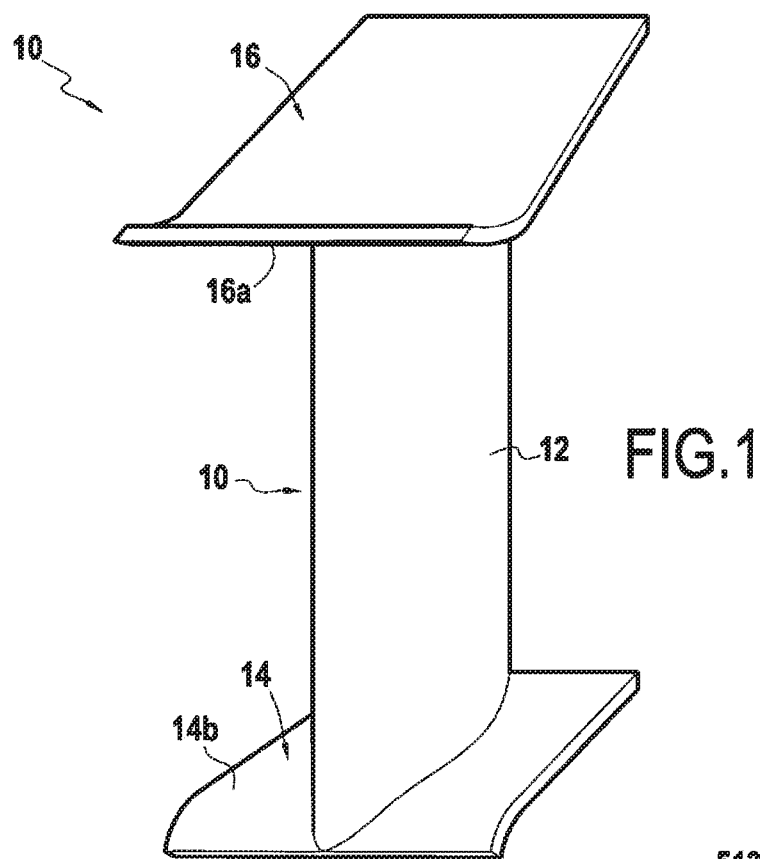
FIG.1
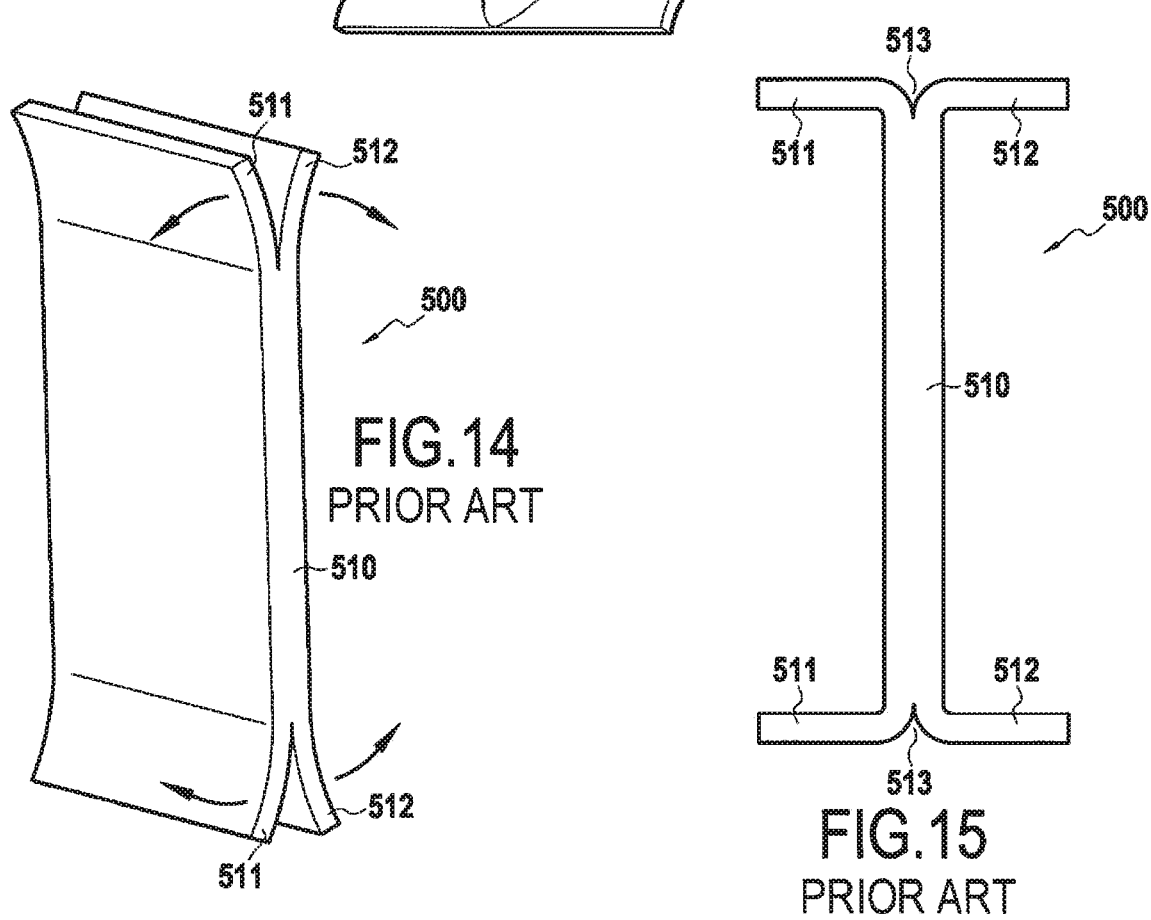
FIG.14 PRIOR ART
FIG.15 PRIOR ART

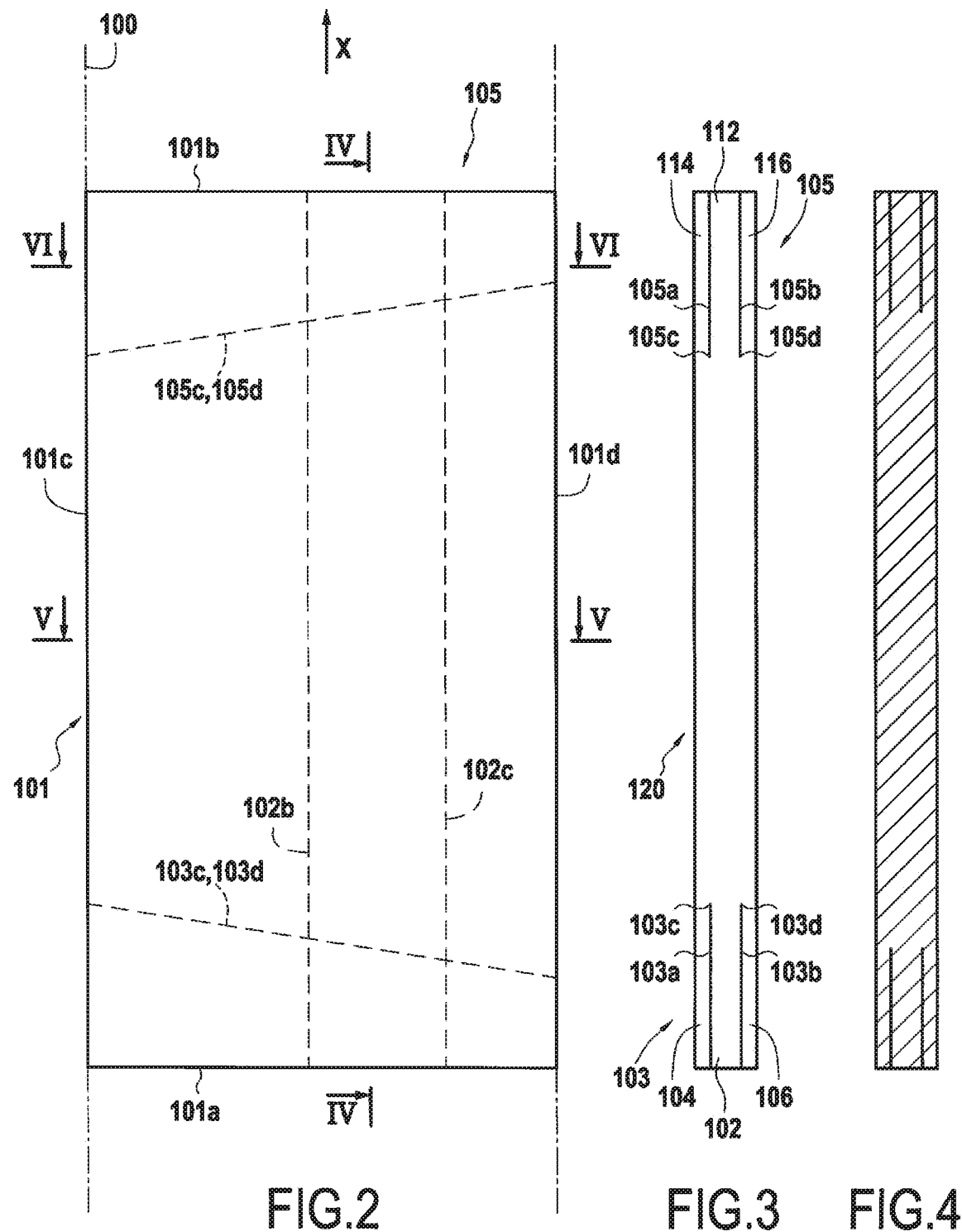

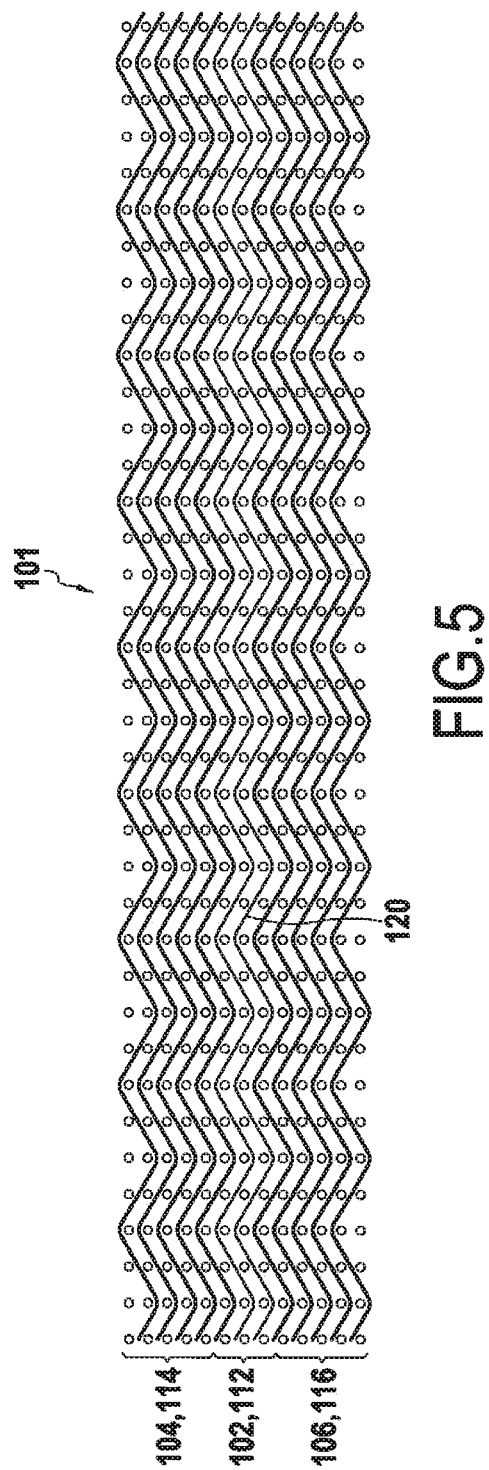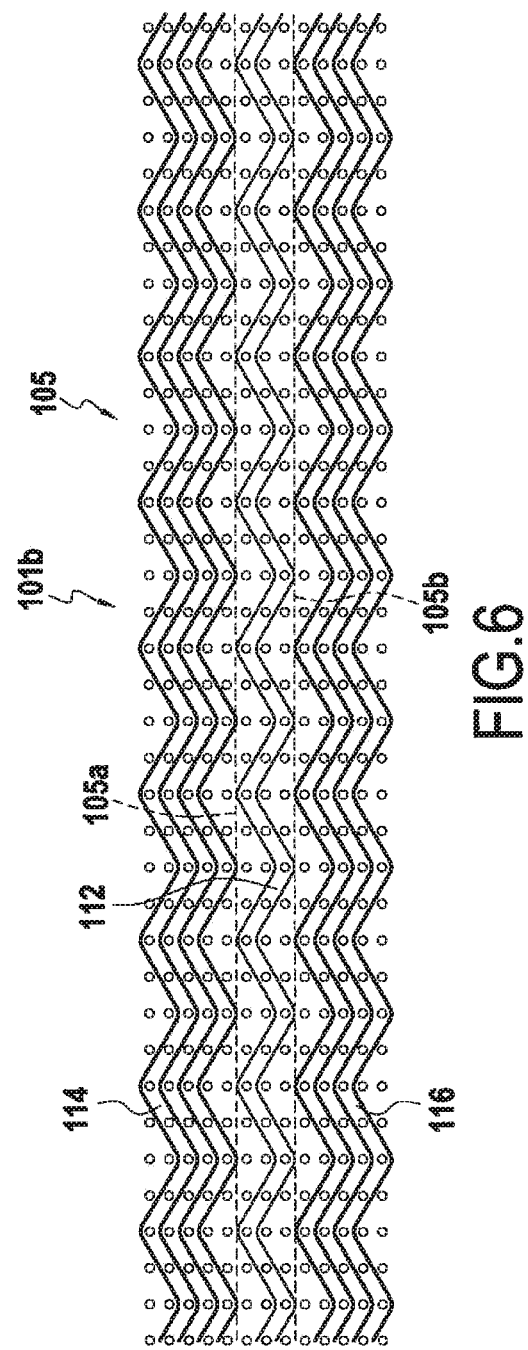

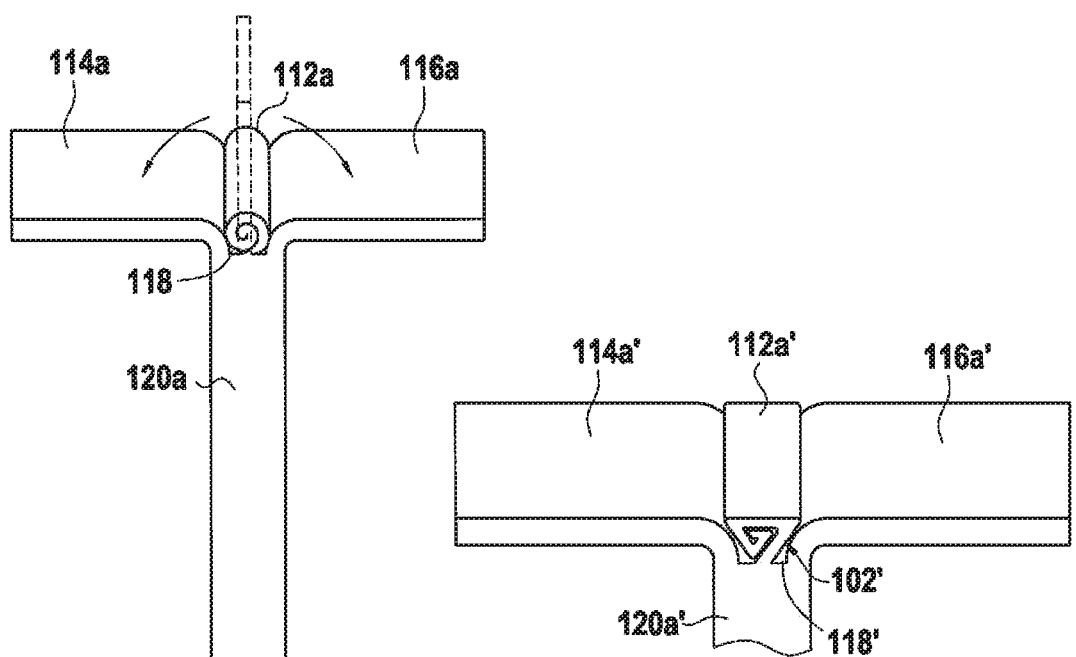
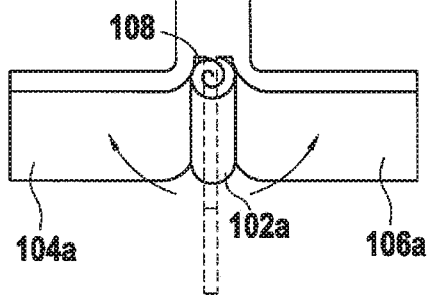
FIG.7
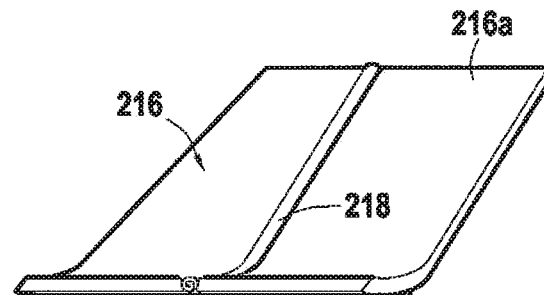
FIG.8
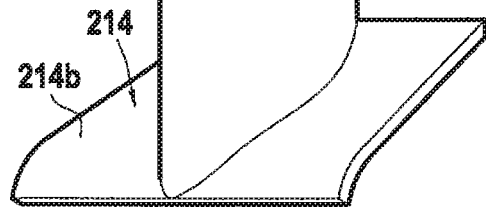
FIG.9

METHOD OF FABRICATING A COMPOSITE MATERIAL PART HAVING A BODY INTEGRAL WITH ONE OR MORE PLATFORMS

CROSS-REFERENCE TO RELATED APPLICATIONS

This application is the U.S. National Stage of PCT/FR2016/052848, filed Nov. 3, 2016, which in turn claims priority to French patent application number 1560649, filed Nov. 6, 2015. The content of these applications are incorporated herein by reference in their entireties.

BACKGROUND OF THE INVENTION

The invention relates to parts made of composite material comprising a solid body together with at least one platform present at one of its ends. Such parts relate particularly, but not exclusively, to turbine engine vanes having incorporated inside and/or outside platforms for a turbine nozzle or for a compressor guide vane set.

Document WO 2013/079860 describes making a turbine engine vane out of composite material having inside and outside platforms integrated therein.

As shown in FIG. 14, a vane with inside and outside platforms integrated therein is made from a fiber blank 500 obtained by three-dimensional (3D) for multilayer weaving, e.g. using yarns of silicon carbide fibers or of carbon fibers. The blank 500 has a portion 510 that is to form the airfoil of the vane and in which all of the yarn layers are interlinked. The fiber blank also includes regions of non-interlinking to provide pairs of portions 511 and 512 at each of its ends. As shown in FIG. 15, the inner and outer platforms can be made by deploying those portions 511 and 512 perpendicularly to the portion 510 that is to form the vane airfoil. The preform as obtained in this way is then densified in known manner with a matrix, e.g. a matrix that is made of a material that is ceramic, an oxide, or organic (thermoplastic, thermosetting, . . . ).

Once the portions 511 and 512 have been deployed, a groove or hollow 513 appears between the two deployed portions 511 and 512. If it is not filled in, the groove 513 can create a zone of weakness that can lead to fibers breaking when the part is stressed mechanically. The groove may be filled in by fitting a filler element that may comprise resin on its own or else fiber reinforcement (braid, roving, etc.) impregnated with resin.

Nevertheless, although filling-in in that way serves to improve the mechanical strength of the vane in the zone where the two platform portions separate, it nevertheless presents certain drawbacks. Specifically, adding a fitted filler element makes fabrication of the part more complex since it adds operations additional to those of fabricating the part proper (secondary operations for forming and inserting the filler element on the part that is to be fabricated). This leads to a higher fabrication cost for the part. In addition, although adding such a filler element does indeed serve to improve the compression strength of the part, its traction strength nevertheless remains problematic since the radii presented by the platform portions where they join the airfoil portion of the vane are deformed under traction stresses, which can lead to losses of cohesion and to detachment of the filler element from the remainder of the vane.

OBJECT AND SUMMARY OF THE INVENTION

Consequently, an object of the invention is to provide a simplified method of fabricating a composite material part having at least one platform integrated therein, which part presents good strength, both in compression and in traction.

To this end, the invention provides a method of fabricating a composite material part having a body secured to at least one platform present at one end of said body, the method comprising:

using multilayer weaving between a plurality of layers of warp yarns to form a fiber blank having a longitudinal direction corresponding to the longitudinal direction of the body of the part that is to be made, the fiber blank being separated in its thickness direction into first, second, and third portions in at least one zone of non-interlinking adjacent to one of its ends, the first portion being situated between the second and third portions, to which it is connected by weaving outside said at least one zone of non-interlinking;

using the fiber blank to form a preform for the part that is to be made by folding out segments of the second and third portions that are not interlinked with the first portion on opposite sides of the first portion, by shaping the folded-out segments of the second and third portions to form preform portions for a platform of the part to be fabricated, and by folding down the segment of the first portion in order to fill in the groove present in the gap between the second and third portions; and densifying the preform with a matrix in order to obtain a part made of composite material having at least one integrated platform.

With the method of the invention, the groove present between the folded-out portions of the fiber blank that are to form the platform is filled in with a fiber texture coming directly from the blank and attached thereto, thus making it possible to avoid adding any separate filling-in element. The method of fabricating the part is thus simplified and the traction and compression strength of the part is improved, since the element is linked with the body of the part by fibers and not only by the matrix.

Furthermore, with the method of the invention, the number of operations needed for filling in the groove present in the gap between the second and third portions is smaller than in the prior art solution that consists in adding a separate filling-in element. Consequently, the method of the invention procures economic savings in the fabrication of the composite material part.

In a particular embodiment, the first, second, and third portions together have the same number of layers of warp yarns as the remainder of the fiber blank situated outside said at least one zone of non-interlinking. This embodiment presents an economic advantage due to its simplicity of fabrication, which does not require additional yarns to be introduced in the various portions of the part.

In another particular embodiment, the first, second, and third portions together comprise a number of warp yarn layers that is greater than the number of warp yarn layers present in the remainder of the fiber blank situated outside said at least one zone of non-interlinking. Under such circumstances, one or more additional layers of warp layers may be woven together with the layers of warp yarns of at least the second and third portions. This embodiment makes it possible to increase the thickness of certain portions of the part, e.g. the platforms, thereby enabling them to convey larger forces.

In yet another particular embodiment, the first, second, and third portions together comprise a number of warp yarn layers that is less than the number of warp yarn layers present in the remainder of the fiber blank situated outside said at least one zone of non-interlinking. Under such circumstances, one or more layers of warp layers are withdrawn during the weaving at least of said second and third portions. This embodiment makes it possible to reduce the thickness of the non-structural portions of the part or the portions in which forces are low, thereby making the part easier to integrate by reducing its overall weight.

BRIEF DESCRIPTION OF THE DRAWINGS

Other characteristics and advantages of the invention appear from the following description of particular embodiments of the invention given as non-limiting examples and with reference to the accompanying drawings, in which:

FIG. 1 is a diagrammatic perspective view of a turbine engine vane;

FIG. 2 is a diagrammatic plan view of a woven fiber blank for use in making a fiber preform for a vane of the type shown in FIG. 1;

FIG. 3 is a side view of the FIG. 2 blank;

FIG. 4 is a diagrammatic section view on plane IV-IV of FIG. 2;

FIGS. 5 and 6 are diagrammatic views on a larger scale of weave planes of the FIG. 2 blank in section view on planes V-V and VI-VI of FIG. 2;

FIGS. 7 to 9 are diagrammatic views showing steps in making a vane preform from the fiber blank of FIGS. 2 to 6;

FIG. 14 is a diagrammatic perspective view of a fiber blank for making a fiber preform for a vane in the prior art; and FIG. 15 is a side view of the FIG. 14 fiber blank after deploying the portions of the blank that are to form inside and outside platforms.

DETAILED DESCRIPTION OF EMBODIMENTS

Figure 10:
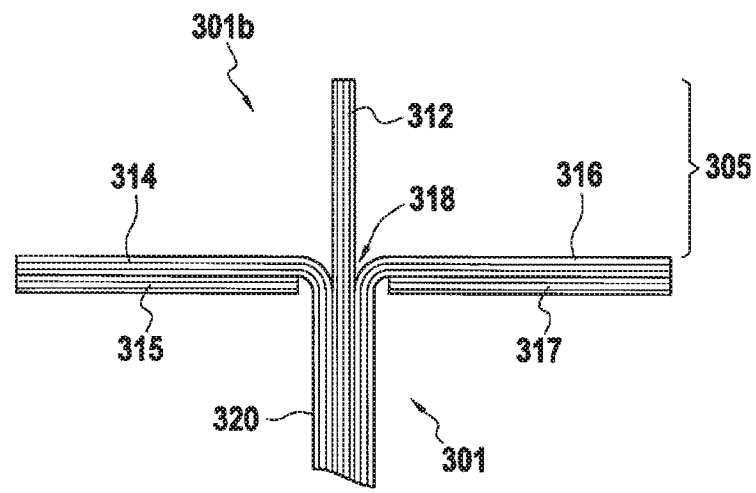
FIG. 10 is a fragmentary side view of another embodiment of a woven fiber blank for making a fiber preform for a vane of the type shown in FIG. 1.

FIG. 1 is a highly diagrammatic view of a vane 10, e.g. an outlet guide vane (OGV) for guiding the bypass stream of an aviation turbine engine. The vane 10 comprises an airfoil 12 and inside and outside platforms 14 and 16.

Throughout the specification, the terms "inside" and "outside" are used with reference to radial positions relative to the axis of the turbine engine.

The outside face 14b of the platform 14 and the inside face 16a of the platform 16 serve to define the flow passage for gas through the turbine after the vane 10 has been mounted in a turbine casing.

The airfoil 12 extends between the platforms 14 and 16, and it is secured thereto. In the example shown, the platforms 14 and 16 extend between their upstream and downstream ends in general directions that form non-zero angles relative to a plane normal to the longitudinal direction of the airfoil 12.

The vane 10 is made of composite material. Fabrication of the vane includes forming a fiber preform of a shape that corresponds to the shape of the vane, and densifying the preform with a matrix.

FIG. 2 is a plan view of a fiber blank 101 from which a fiber preform of the vane 10 can be formed.

The blank 101 may be obtained from a strip 100 woven by three-dimensional (3D) or multilayer weaving, the strip 100 extending in general manner in a direction X that corresponds to the longitudinal direction of the vane that is to be fabricated. By way of example, weaving is performed with warp yarns extending in the direction X, it being understood that weaving with weft yarns extending in this direction is also possible. A plurality of blanks 101 may be woven one after another in the direction X. It is also possible to weave a plurality of parallel rows of blanks 101 simultaneously.

In the embodiment of FIGS. 2 to 6, a blank 101 includes in its thickness direction and at each of its ends 101a and 101b, a first portion 102, 112, a second portion 104, 114, and a third portion 106, 116. The portion 102 is situated between the portion 104 and the portion 106 and is interlinked with the portions 104 and 106 by 3D weaving in a zone 120 that is to form the airfoil of the vane and is not interlinked with the portions 104 and 106 in a zone of non-interlinking 103 comprising first non-interlinking 103a between the portion 102 and the portion 104 and second non-interlinking 103b between the portion 102 and the portion 106. The non-interlinking 103a, 103b extends over the entire width of the blank 101 (dimension in the weft direction) from the end 101a of the blank 101 to the bottoms of non-interlinking 103c and 103d. The bottoms of non-interlinking 103c and 103d extend between the longitudinal edges 101c and 101d of the blank 101 in a direction forming a non-zero angle relative to the weft direction in order to comply with the orientation of the inside platform 14.

The portion 112 is situated between the portion 114 and the portion 116, and it is interlinked with the portions 114 and 116 by 3D weaving in the zone 120 that is to form the airfoil of the vane, while not being interlinked with the portions 114 and 116 in a zone of non-interlinking 105 comprising first non-interlinking 105a between the portion 112 and the portion 114, and second non-interlinking 105b between the portion 112 and the portion 116. The non-interlinking 105a, 105b extends over the entire width of the blank 101 from the end 101b of the blank 101 to bottoms of non-interlinking 105c and 105d. The bottoms of non-interlinking 105c and 105d extend between the longitudinal edges 101c and 101d of the blank 101 in a direction forming a non-zero angle relative to the weft direction in order to comply with the orientation of the outside platform 16.

In well-known manner, non-interlinking is provided between two layers of warp yarns by not passing a weft yarn across the zone of non-interlinking to interlink yarns of warp layers situated on either side of the non-interlinking.

The plan views of FIGS. 5 and 6 show an example of 3D weaving with an interlock weave and with non-interlinking 105a and 105b, the non-interlinking 103a and 103b being obtained in the same manner as the non-interlinking 105a and 105b. In FIG. 6, the non-interlinking is represented by dashed lines. The portion 112 comprises a plurality of warp yarn layers (three layers in the example shown) that are interlinked by 3D weaving. Each of the portions 114 and 116 comprises a plurality of warp yarn layers (five layers in the example shown) that are mutually interlinked by 3D weaving. Between the zone of non-interlinking 103 defined by the bottoms of non-interlinking 103c and 103d and the zone of non-interlinking 105 defined by the bottoms of non-interlinking 105c and 105d, the layers of warp yarns in the portions 102, 112, 104, 114, and 106, 116 are all interlinked with one another in the example shown (FIG. 5).

After weaving, the segments 104a, 114a and 106a, 116a of the portions 104, 106, 114, and 116 that are not interlinked with the portions 102 and 112 are folded out or deployed as shown in FIG. 7 in order to form preform portions for the platforms 14, 16, with the segments 104a, 114a being adjacent to the non-interlinking 103a, 105a, and the segments 106a, 116a being adjacent to the non-interlinking 103b, 105b. The folding takes place at the bottoms of non-interlinkings.

As shown in FIG. 7, folding out the segments 104a and 106a of the portions 104 and 106 leads to a groove 108 being formed between the portions 104 and 106 where they become separated in the blank 101, the segment 102a and the portion 102 extending from the center of the groove 108. Likewise, folding out the segments 114a and 116a of the portions 114 and 116 leads to a groove 118 being formed between the portions 114 and 116 where they become separated in the blank 101, the segment 112a of the portion 112 extending from the bottom of the groove 118.

In accordance with the invention, the groove 118 is filled in by folding down the segment 102a into said groove, while the groove 118 is filled in by folding down the segment 112a into said groove. The segments 102a and 112a may be folded down in various ways. By way of example, they may be rolled up in the corresponding grooves with increasing radius as shown in FIG. 7 for the segment 102, or they may be rolled up in the corresponding grooves with rectilinear portions that are substantially parallel to the edges of the grooves, as shown in FIG. 8 for a segment 112a' rolled up in a groove 118' present between unfolded segments 114a' and 116a'.

A fiber preform for the vane that is to be fabricated is then made by molding using conformation tooling, being deformed so as to obtain the desired hollow airfoil profile and the desired shapes for the platforms. This produces a preform 210 (FIG. 9) with a preform portion 220 for the airfoil that is obtained by shaping the segment 120a (FIG. 7), and with preform portions 214 and 216 for the inside and outside platforms as obtained by shaping the segments 104a, 106a, 114a, and 116a. The central portion of the top surface 216a of the preform portion 216 corresponding to the location of the groove 118 is filled in by a preform portion 218 obtained by shaping the segment 112a, as described above. Likewise, the central portion of the bottom surface of the preform portion 214 corresponding to the location of the groove 108 is filled in by a preform portion obtained by shaping the segment 102a (not shown in FIG. 9).

A hollow CMC vane such as that shown in FIG. 1 may be fabricated as follows.

A fiber strip 100 is woven by three-dimensional weaving, being made up of a plurality of fiber blanks 101, e.g. extending in the warp direction, together with zones of non-interlinking as shown in FIG. 2. The weaving may be performed using yarns made of ceramic, in particular yarns based on silicon carbide (SiC), e.g. those supplied under the name "Nicalon" by the Japanese supplier Nippon Carbon. Other ceramic yarns can be used, in particular yarns made of refractory oxide, such as yarns based on alumina $Al_2O_3$, in particular for CMC materials of the oxide/oxide type (fiber reinforcement fibers and matrix both made of refractory oxide). It is also possible to use carbon fibers for a CMC material having carbon fiber reinforcement.

In known manner, the fiber strip may be treated to eliminate the sizing present on the fibers and to eliminate the presence of oxide on the surfaces of the fibers.

Also in known manner, a thin embrittlement-release interphase coating layer may then be formed on the fibers of the fiber strip by chemical vapor infiltration (CVI). By way of example, the interphase material may be pyrolytic carbon PyC, boron nitride BN, or boron doped carbon BC. By way of example, the thickness of the layer that is formed may lie in the range 10 nanometers (nm) to 100 nm, in order for the filter blanks to conserve the ability to deform.

Thereafter, the fiber strip may be impregnated with a consolidation composition, typically a carbon precursor resin or a ceramic precursor resin, possibly diluted in a solvent. After drying, the individual fiber blanks are cut apart. Each blank is shaped (as shown in FIGS. 7 to 9) and placed in tooling for shaping the preform portions corresponding to the airfoil and corresponding to the inside and outside platforms.

Thereafter, the resin is cured and then pyrolyzed after removing the preform from the conformation tooling in order to obtain a vane preform that is consolidated by the pyrolysis residue. The quantity of consolidation resin is selected to be sufficient but not excessive so that the pyrolysis residue bonds together the fibers of the preform so as to enable it to be handled while conserving its shape, without the assistance of tooling.

A second embrittlement-release interphase coating layer may be formed by CVI, e.g. out of PyC, BN, or BC. Making an interphase coating as two layers before and after consolidation is described in Document EP 2 154 119.

The consolidated preform is then densified with a ceramic matrix, e.g. by CVI. The matrix may be of SiC or it may be a self-healing matrix having matrix phases made of pyrolytic carbon PyC, of boron carbide $B_4C$, or of a ternary Si—B—C system as described in particular in Documents U.S. Pat. Nos. 5,246,756 and 5, 965,266. Other types of ceramic matrix may be envisaged, in particular matrices made of refractory oxides, e.g. of alumina, in particular for CMC materials of oxide/oxide type.

Densification is preferably performed in two steps that are separated by a step of machining the vane to its desired dimensions, in particular in order to obtain the desired final shape for the platforms 14, 16 and possibly also in order to obtain the desired profile for the airfoil 12.

The vane may also be made of organic matrix composite (OMC) material which may be thermoplastic or thermosetting, with any type of fiber preform. Under such circumstances, the resulting fiber preform is densified in conventional manner using a liquid technique.

The liquid technique consists in impregnating the fiber preform with a resin. The preform is placed in a mold that may be closed in leaktight manner so as to have a recess of the shape of the final molded part. Thereafter, resin is injected, e.g. a thermoplastic or a thermosetting resin, so as to fill the entire recess and impregnate all of the fiber portion of the preform.

Polymerization is performed by heat treatment (generally by heating the mold). Since the preform is still held inside the mold, its shape matches the shape of the part that is to be made. The organic matrix may in particular be obtained using epoxy resins.

In the embodiment described above, the first portions 102, 112, the second portions 104, 114, and the third portions 106, 116 together have the same number of layers of warp yarns as the remainder of the fiber blank 101 situated outside the zones 103 and 105 of non-interlinking, i.e. throughout the zone 120. In the example shown in FIGS. 5 and 6, the second and third portions 114 and 116 each comprise five layers of warp yarns while the first portion 112 comprises three layers of warp yarns. The same applies for the first, second, and third portions 102, 104, and 106 that are not shown in FIGS. 5 and 6.

In another embodiment of the invention, the first, second, and third portions together have a number of warp yarn layers that is greater than the number of warp yarns layers present in the remainder of the fiber blank situated outside the zones of non-interlinking in the fiber blank. Under such circumstances, one or more additional layers of warp yarns are woven together with the layers of warp yarns in at least the second and third portions.

Figure 11:
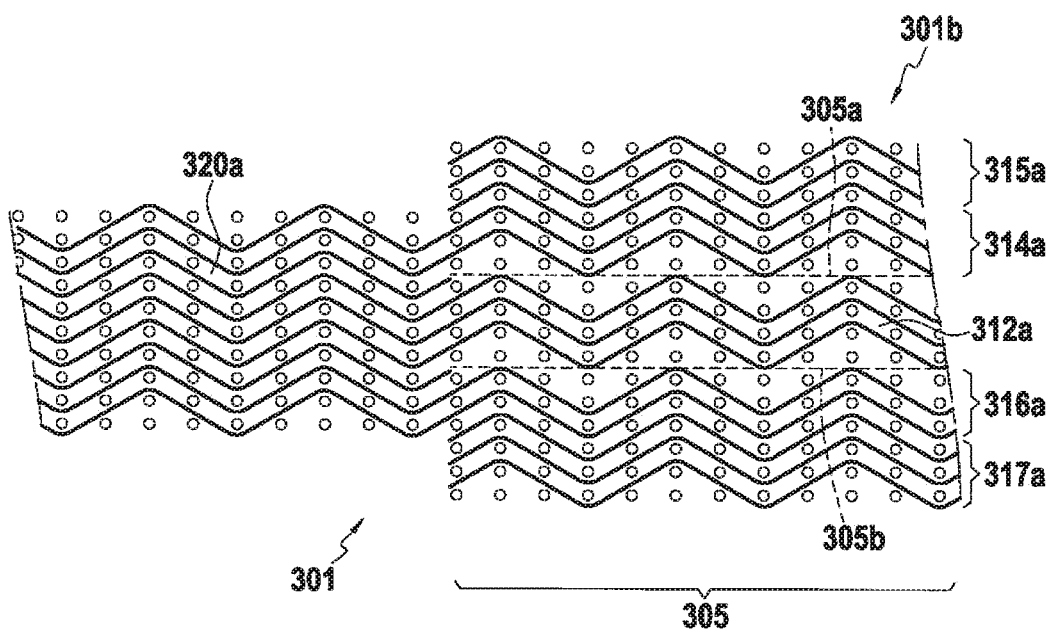
FIG. 11 is a diagrammatic view on a larger scale of weave planes in the FIG. 10 blank.

FIGS. 10 and 11 show an end 301b of a fiber blank 301 that differs from the end 101b of the fiber blank 101 as described above and as shown in FIGS. 6 and 7 in that additional layers of warp yarns are woven together with the second and third portions 314 and 316 that are to form the outside platform of the vane. More precisely, in the zone of non-interlinking 305, a ply 315 having three additional layers of warp yarns has been woven together with the second portion 314 from the beginning of the non-interlinking 305a where the first portion 312 separates from the second portion 314, and a ply 317 comprising three additional layers of warp yarns has been woven with the third portion 316 from the beginning of the non-interlinking 305b where the first portion 312 separates from the third portion 316. As described above for the portion 112 of the blank 101, the first portion 312 is for being folded down in order to fill in the groove 318 formed between the folded-out segments of the portions 314 and 316. Thus, in the zone of non-interlinking 305, the blank 301 has first, second, and third portions 312, 314, and 316 that together have a number of warp yarn layers that is greater than the number of warp yarns layers present in a zone 120 situated outside the zones of non-interlinking of the fiber blank.

In yet another embodiment of the invention, the first, second, and third portions together have a number of warp yarn layers that is less than the number of warp yarn layers present in the remainder of the fiber blank situated outside the zones of non-interlinking of the fiber blank. Under such circumstances, one or more layers of warp yarns are withdrawn, i.e. they are not woven and they are extracted from the blank in the zones of non-interlinking of the blank.

Figure 12:
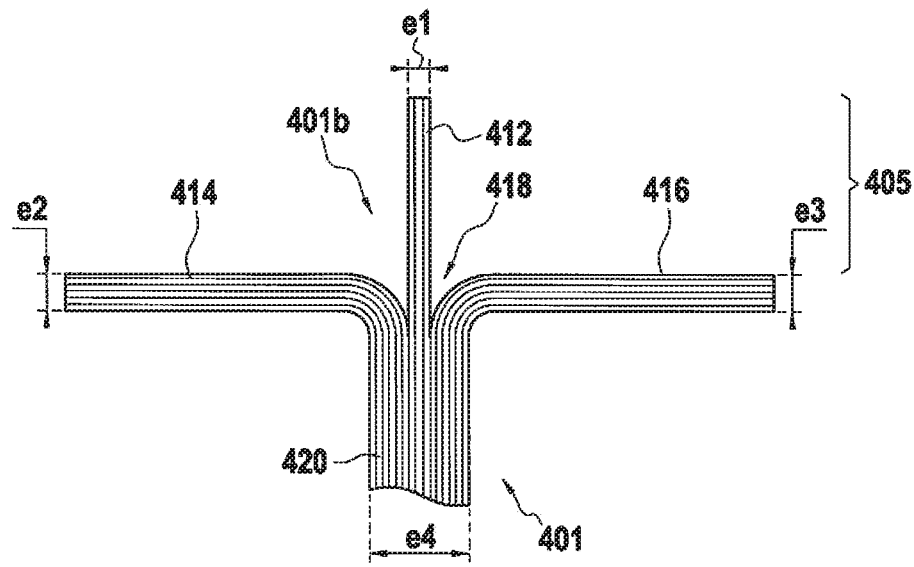
FIG. 12 is a fragmentary side view of another embodiment of a woven fiber blank for making a fiber preform for a vane of the type shown in FIG. 1.
Figure 13:
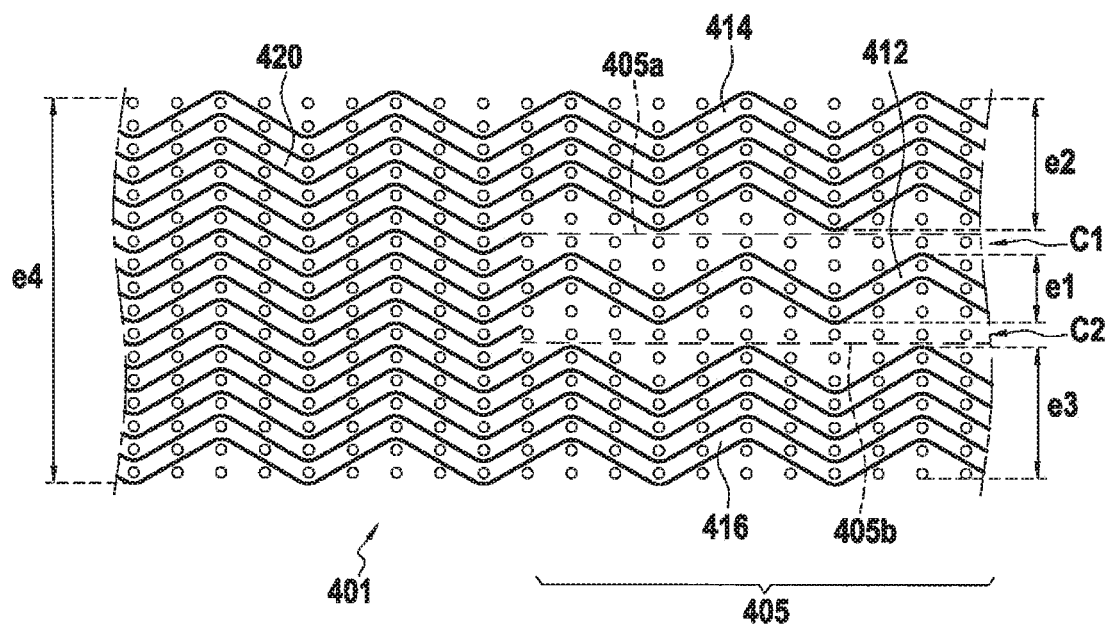
FIG. 13 is a diagrammatic view on a larger scale of weave planes of the FIG. 12 blank.

FIGS. 12 and 13 show an end 401b of a fiber blank 401 that differs from the end 101b of the heater blank 101 described above and shown in FIGS. 6 and 7 in that layers of warp yarns have been removed in a zone of non-interlinking 405 having non-interlinking 405a between the first portion 412 and the second portion 414 and non-interlinking 405b between the first portion 412 and the third portion 416, the second and third portions 414 and 416 being for forming the outside platform of the vane. More precisely, from the beginning of the zone of non-interlinking 405, two layers of warp yarns C1 and C2 are no longer woven with the layers of warp yarns used for forming the first portion 412 (FIG. 13). The layers C1 and C2 can thus be withdrawn in the zone of non-interlinking 405 such that the first portion 412 has only three layers of warp yarns, while the second and third portions 414 and 416 each have six layers of warp yarns. The total accumulated thicknesses e1, e2, and e3 respectively of the first, second, and third portions 412, 414, and 416 is less than the thickness e4 of the portion 420 of the blank that is to form the preform of the vane airfoil. As described above for the segment 112a of the blank 101, the first portion 412 is for folding down in order to fill in the groove 418 formed between the folded-out segments of the second and third portions 414 and 416.

The method of the invention is described above with reference to fabricating an outlet guide vane (OGV) in a set of guide vanes of a turbine engine. Nevertheless, the method of the invention can be applied in particular to fabricating any aviation part that comprises a body with at least one integrated platform. The method of the invention may be used in particular for fabricating the moving blades of a turbine engine, stiffeners, and fittings.

The invention claimed is:

1. A method of fabricating a composite material part having a body secured to at least one platform present at one end of said body, the method comprising:
using multilayer weaving between a plurality of layers of warp yarns to form a fiber blank having a longitudinal direction corresponding to the longitudinal direction of the body of the part that is to be made, the fiber blank being separated in its thickness direction into first, second, and third portions in at least one zone of non-interlinking adjacent to one of its ends, the first portion being situated between the second and third portions, to which it is connected by weaving outside said at least one zone of non-interlinking;
using the fiber blank to form a preform for the part that is to be made by folding out segments of the second and third portions that are not interlinked with the first portion on opposite sides of the first portion, by shaping the folded-out segments of the second and third portions to form preform portions for a platform of the part to be fabricated, and by folding down the segment of the first portion in order to fill in the groove present in the gap between the second and third portions; and
densifying the preform with a matrix in order to obtain a part made of composite material having at least one integrated platform.

2. The method according to claim 1, wherein the first, second, and third portions together have the same number of layers of warp yarns as the remainder of the fiber blank situated outside said at least one zone of non-interlinking.

3. The method according to claim 1, wherein the first, second, and third portions together comprise a number of warp yarn layers that is greater than the number of warp yarn layers present in the remainder of the fiber blank situated outside said at least one zone of non-interlinking.

4. The method according to claim 3, wherein one or more additional layers of warp layers are woven together with the layers of warp yarns of at least the second and third portions.

5. The method according to claim 1, wherein the first, second, and third portions together comprise a number of warp yarn layers that is less than the number of warp yarn layers present in the remainder of the fiber blank situated outside said at least one zone of non-interlinking.

6. The method according to claim 5, wherein one or more layers of warp layers are withdrawn during the weaving at least of said second and third portions.

7. The method according to claim 1, wherein the composite material part corresponds to an aviation part selected from at least one of the following parts: a turbine engine vane, a turbine engine blade, a stiffener, and a fitting.

* * * * *